2,874,769

EVAPORATION OF BENZENE HEXACHLORIDE SOLUTIONS

Thomas Robert Bell III, Stafford, and Ford R. Lowdermilk, Gwynedd Valley, Pa., assignors to Pennsalt Chemicals Corporation, a corporation of Pennsylvania No Drawing. Application May 31, 1956
Serial No. 588,246

3 Claims. (Cl. 159—49)

This invention relates to a process for the separation of alcohol from alcoholic solutions of benzene hexachloride by evaporation.

More particularly, the process is directed to the separation of methanol or ethanol from alcoholic solutions of benzene hexachloride containing the gamma isomer in the range of 25 to 60%.

Benzene hexachloride is generally produced by the photo-catalytic chlorination of benzene at temperatures varying from below zero to 100° C. The gamma isomer content of the natural chlorination products generally varies within the range of 12 to 16%. Many processes have been devised employing special chlorination catalysts to increase the gamma isomer content of the natural chlorination product.

The gamma isomer of benzene hexachloride is important commercially for its insecticidal properties in the agricultural chemical field. The commercial grades of benzene hexachloride which the manufacturers produce and sell to distributors have an enhanced gamma isomer content varying from 35 to 99+%.

The processes for enhancing the gamma isomer content of the chlorination product are usually divided into extraction processes or crystallization processes, or combinations of both; and often employ methyl or ethyl alcohol as the extraction or crystallization solvent. It is important in these commercial processes for enhancing the gamma isomer content that the benzene hexachloride be separated from the alcohols in an efficient and economical manner. It is important to the economics of the separation processes that nearly all of the alcohol and the high-gamma benzene hexachloride be recovered without loss or degradation of the gamma benzene hexachloride in as simple a manner as possible.

Accordingly it is the principal object of this invention to provide a simple and economical process for the separation and recovery of high-gamma benzene hexachloride from alcoholic solutions. It is a further object of this invention to separate high-gamma benzene hexachloride from alcoholic solutions by film-type evaporation.

The prior art attempts at evaporation of alcoholic benzene hexachloride solutions have been generally unsatisfactory for a number of reasons. Chief among these has been the fouling of the evaporator tube due to benzene hexachloride coming out of solution before it is in a proper condition for its removal. The resulting formation of crusts and plugs of solid benzene hexachloride in the evaporator tubes necessitates a shutdown of the unit with the consequent loss of production and the extra labor charges necessary to place the unit back into operation.

Another difficulty inherent in this evaporation process which our novel process overcomes, is the degradation of the benzene hexachloride. Improper operation of the evaporator can cause the benzene hexachloride to bridge and plug the tubes. The fouling of the evaporator tubes is usually attended with the decomposition of the solid-caked benzene hexachloride after prolonged heating.

The decomposition is accompanied with the release of corrosive gases and with serious discoloration of the product. The decomposition affects not merely the color of the material undergoing decomposition but also adversely affects large quantities of material passing by the fouled portion of the evaporator. The net result is that large quantities of product are either wasted due to discoloration, or else it must be subjected to special processing, at additional cost, to remove the objectionable color. The decomposition also releases acid gases which seriously corrode the metal processing equipment. The corrosion seriously shortens the life of the process equipment and also increases product cost due to the increase in shutdown time for equipment repairs.

Another type of difficulty encountered in this evaporation process is effecting complete removal of the alcohol from the liquid benzene hexachloride. Failure to completely remove the alcohol solvent will cause the permanent loss of the non-removed portion. The principal consideration in effecting substantially complete removal of the alcohol is the heating of benzene hexachloride at a high enough temperature for a length of time sufficient for complete evaporation but without decomposition of the organic benzene hexachloride.

The foregoing objects are attained and the difficulties of the art avoided by the processes of the present invention. We have discovered a method of continuously evaporating alcoholic solutions of benzene hexachloride in film-type evaporators which very simply effects separation of the materials.

This process provides for the introduction of liquid alcoholic solutions of benzene hexachloride of a definite benzene hexachloride solids content and of a specific gamma isomer content at a specified minimum temperature to the final stage of a multi-effect, film-type evaporation system. The alcohol is substantially all vaporized while the benzene hexachloride is heated within a specified temperature range. Then the alcohol vapors and the liquid benzene hexachloride are introduced into a vapor-liquid separator of a conventional centrifugal type wherein final separation of vapor and liquid is effected.

The benzene hexachloride content of the alcoholic solution being introduced to the last stage of the evaporator system must be held in the range of 20–45% solids, preferably, in the range of 25 to 35%. A lower concentration of benzene hexachloride solids will cause plugging and fouling in the evaporator tubes because of the excessive high vapor velocity of the evaporated alcohol in proportion to the amount of molten benzene hexachloride. Reduction of the vapor velocity merely by increasing the evaporator tube diameter will not solve the plugging difficulties because of the increased difficulty of heat transfer and the increased decomposition of the organic matter due to prolonged heating. The concentrations of benzene hexachloride which are higher then the range specified are unsatisfactory because of their increased tendency to come out of solution before they are in proper condition with resulting fouling of evaporator tubes.

The gamma isomer content of the benzene hexachloride solute must be held within the concentration range of 25 to 60% and preferably within the range of 35 to 50%. Failure to keep the gamma isomer within these ranges will drop the benzene hexachloride out of solution too fast and with consequent bridging and fouling of the tubes. The gamma isomer content of the benzene hexachloride mixture importantly affects the solubility of the benzene hexachloride in the alcohol solvent. This is due to the varying solubility of the different isomers in alcohol. Thus, the solubilities of the isomers in methyl and ethyl alcohol at 20° C. are as follows:

SOLUBILITY OF ISOMERS IN GRAMS PER 100 GRAMS OF ALCOHOL AT 20° C.

| Solvent | Alpha | Beta | Gamma | Delta | Epsilon |
|---|---|---|---|---|---|
| Ethanol | 2.5 | 0.93 | 6.7 | 31.2 | 4.2 |
| Methanol | 2.4 | 1.2 | 7.9 | 37.6 | 3.6 |

The gamma isomer content of the benzene hexachloride mixture is also important in determining the final temperature of the benzene hexachloride melt during its heating in the final evaporator tube. The various isomers of benzene hexachloride have widely different melting points so that the composition of the isomer mixture importantly determines its melting point and hence the temperature range in which the isomer mixture is liquid.

Isomer:                         Melting point, °/C.
    Alpha                              158
    Beta                                309
    Gamma                            114
    Delta                               139
    Epsilon                           219

Thus, the temperature range to which the benzene hexachloride of 25 to 60% gamma isomer content must be heated in order to ensure that the benzene hexachloride will finally be in the liquid stage is in the range of 200 to 350° F. At the same time, this temperature range will ensure that the separation of the alcohol vapor from the liquid benzene hexachloride is complete and without decomposition of the benzene hexachloride melt.

A minimum feed temperature to the final evaporator of 145° F. is necessary to insure that an alcoholic benzene hexachloride solution of 20 to 45% solids of which the gama isomer content is in the range of 25 to 60% is in the liquid state. The upper temperature limit for the feed composition to the final evaporator stage will be a temperature just below the boiling point of the above isomer solution; that is, at that temperature just below the point where vaporization occurs.

It is also important in the separation of the alcohol from the alcoholic-benzene hexachloride solutions that the liquid alcohol be nearly entirely converted to the vapor phase. Moreover, it is important to maintain the alcohol vapor at a temperature far above the vaporization point in the mixture in order that the gaseous alcohol and the molten benzene hexachloride do not re-combine while undergoing separation in the centriffugal separator after the final evaporation stage. Thus, it is important that the gaseous alcohol and the molten benzene hexachloride as it leaves the final evaporator tube and enters the separator be maintained at approximately the same temperature. This final temperature of the molten benezene hexachloride as it leaves the final evaporator tubes is in the range of 200° to 350° F.

The above limitations as to the benzene hexachloride solids content, the specification of the gamma isomer content of the benzene hexachloride solids, the minimum temperature of the feed solution which must be in the liquid state, and the final temperature to which the alcohol and benzene hexachloride must be heated in order to insure complete vaporization of the alcohol from the molten benzene hexachloride are directed solely to the processing conditions in the final evaporator stage. The concentration of more dilute benzene hexachloride solutions can be effected in any number of evaporation stages without practicing the invention herein described.

The introduction of heat to the alcohol-benzene hexachloride solution can only be effected by indirect heat transfer as through the wall of an evaporator tube in accordance with our invention. Direct combustion in the presence of the solution would be impossible because of the flammability of the alcohol. Likewise, the direct introduction of steam would be impractical because of the dilution and contamination of the products.

We have found that a rising-film type of evaporation is better suited to the practice of our invention although other film-types of evaporation, such as the horizontal or vertical down-flow may be used.

Our new process works equally well with ethyl alcohol or methyl alcohol since the solubilities of the various isomers in the two solvents are almost identical as shown in the table above.

The following examples illustrate but do not limit our invention:

*Example 1*

In a two-stage evaporator, the first stage consisted of a ⅜ I. D. nickel tube, 3 ft. long, and jacketed for steam heating. The vapor-liquid centrifugal separator between the first and second stage was 2½ I. D. with a ¾" vapor outlet and a ¼" liquid outlet. The second-stage nickel evaporator tube was ⅜ I. D. by 2 ft. in length and jacketed for steam heating. The separator for the second-stage tube was 4 I. D. and had a 1" vapor outlet and ⅜" liquid outlet.

98½ pounds of a methanol solution of benzene hexachloride containing 18½% solids, of which the gamma isomer content was 46.3%, were introduced continuously over a period of 10 hours into a two-stage rising-film type evaporator. The first evaporator tube was heated by applying steam at 0 p. s. i. g. to the jacket. The temperature of the liquid solution leaving the first stage evaporator and entering the second stage was 150° F.

40.2 pounds of methanol were recovered from a condenser following its removal from the first separator. The average concentration of the solids in the liquid solution introduced to the bottom of the second and last evaporator thus was 31.3% benzene hexachloride over the 10-hour period. The temperature of the methanol solution introduced at the bottom of the tube in the second stage was 150° F. Steam was applied at 20 p. s. i. g. so that substantially all of the methanol was vaporized by the time the material left the second tube. The temperature of the benzene hexachloride leaving the second tube and entering the separator was held close to 240° F. The methanol recovered from a condenser after leaving the liquid-vapor separator of the second stage amounted to 38.6 pounds. The benzene hexachloride recovered from the second stage separator was of a good pale-amber color (molten) and contained less than 0.1% methanol.

No plugging occurred in either evaporator tube and at the end of the run no deposit was observed on either tube.

*Example 2*

Approximately 50 pounds of a methanol solution of benzene hexachloride containing 17.5% solids, of which the gamma isomer content was 45.8%, were introduced continuously into the apparatus of Example 1 over a period of 6 hours. 25.7 pounds of methanol were recovered from the separator between the first and second stages. The liquid from the first evaporator stage containing 36.4% solids was introduced to the bottom of the second stage evaporator at a temperature of about 152° F.

The solution was heated in the second stage until all the methanol was evaporated and the benzene hexachloride melt reached a temperature of 258° F. The alcohol vapor and molten benzene hexachloride were introduced into the vapor liquid separator at the same temperature of 258° F. Approximately 15.4 pounds of methanol were collected from the second stage. The molten benzene hexachloride recovered was of a pale amber color. The methanol content of the product was less than 0.1%. About 8.8 pounds of product benzene hexachloride were collected. No fouling of the evaporator tube was noted.

Example 3

In the apparatus of Example 1, 55 pounds of a methanol solution of benzene hexachloride were introduced continuously over a period of 5 hours. The gamma isomer content of the benzene hexachloride solute was 46.8% while the solids concentration into the first evaporator stage was 16.3%. The solution was heated until the liquid phase reached a temperature of 152° F. at which point 19.8 pounds of methanol had been vaporized and separated from the benzene hexachloride solution in the first separator.

The liquid solution to the second evaporator stage averaged 25.9% solids at a temperature of 152° F. The solution was heated until a temperature of 255° F. was reached at which point the alcohol vapor and molten benzene hexachloride were introduced into the second stage separator. After condensation, the methanol separated over the 5-hour period amounted to 25.7 pounds. The molten benzene hexachloride amounted to 9 pounds and was of a good pale color and its alcohol content was less than 0.1%.

The preceding examples were described using methanol as the solvent although ethanol could have been employed with equally advantageous results.

Example 4

The methanol solution of benzene hexachloride was introduced at the bottom of a single stage evaporator having a ⅜" diameter tube 3½' in length at an average feed rate of 15 pounds per hour. The feed material contained 18.7% benzene hexachloride solids of 42% gamma isomer content (dry basis).

The steam pressure on the evaporator jacket was maintained at 25 p. s. i. g. while the temperature of the benzene hexachloride melt leaving the evaporator was 258° F.

After four hours of operation a total of 53 pounds of feed material had been introduced when the feed rate gradually fell off. Wide fluctuations in feed rate were noticed in the next two and one-half hours. After six and one-half hours of operation, the unit was dismantled and found plugged with benzene hexachloride solids.

We claim:

1. In a multistage process for the separation of alcohol from alcohol-benzene hexachloride solutions the improvement comprising evaporating as a film in a final stage liquid solutions of 20 to 45% benzene hexachloride solids of 25 to 60% gamma isomer content dissolved in an aliphatic monohydric alcohol containing not more than 2 carbon atoms, at an initial temperature of at least 145° F. by indirect heat transfer, continuing the said evaporation until all of the alcohol is vaporized and the benzene hexachloride solute has a final temperature of at least 200° F., but not more than 350° F., and is entirely in the liquid state and thereafter separating the alcoholic vapor from the molten benzene hexachloride while maintaining the said final temperature.

2. The process of claim 1 in which the alcohol is methanol.

3. In a multistage process for the continuous separation of methanol from methanol-benzene hexachloride solutions containing 25 to 35% benzene hexachloride solids of 35 to 50% gamma isomer content the improvement comprising evaporating as a film in a final stage the said methanol-benzene hexachloride solutions at an initial temperature of at least 145° F. by indirect heat transfer, continuing the said evaporation until all of the methanol is vaporized and the benzene hexachloride solute has a final temperature of at least 200° F. but not more than 350° F. and is entirely in the liquid state, and thereafter separating the methanol vapor from the molten benzene hexachloride while maintaining the said final temperature.

References Cited in the file of this patent

UNITED STATES PATENTS

| | | |
|---|---|---|
| 2,672,926 | Cross | Mar. 23, 1954 |
| 2,699,455 | Smith et al. | Jan. 11, 1955 |
| 2,773,103 | Calingaert | Dec. 4, 1956 |
| 2,779,724 | Dunning et al. | Jan. 29, 1957 |